March 25, 1924.
W. O. RUNCIE
METHOD OF PRODUCING AND EXHIBITING PICTURES POSSESSING STEREOSCOPIC RELIEF AND PICTURES PRODUCED BY SUCH METHOD
Filed May 24, 1918 3 Sheets-Sheet 1
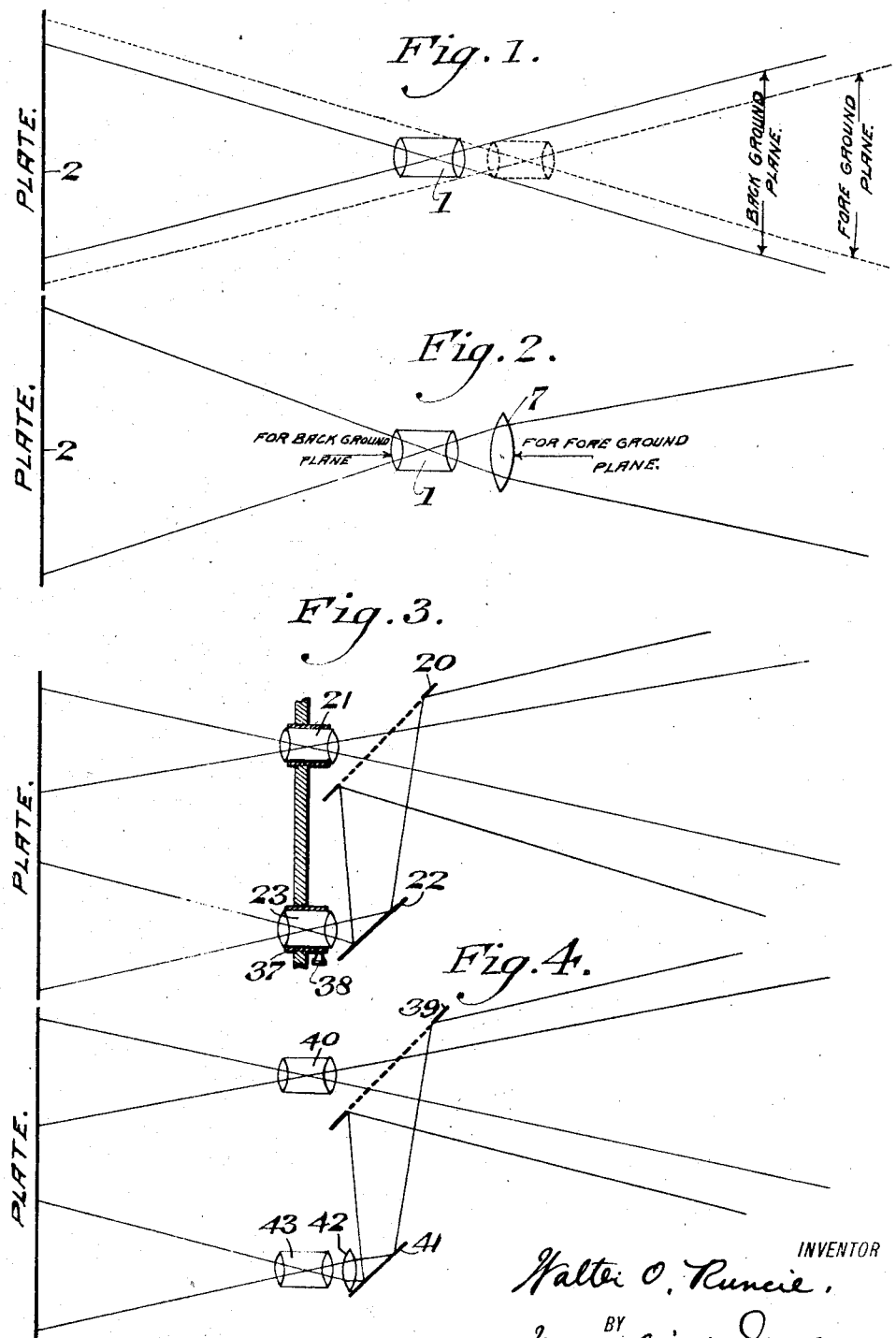

March 25, 1924.  1,488,027

W. O. RUNCIE

METHOD OF PRODUCING AND EXHIBITING PICTURES POSSESSING STEREOSCOPIC RELIEF AND PICTURES PRODUCED BY SUCH METHOD

Filed May 24, 1918  3 Sheets-Sheet 2

March 25, 1924.
W. O. RUNCIE
METHOD OF PRODUCING AND EXHIBITING PICTURES POSSESSING
STEREOSCOPIC RELIEF AND PICTURES PRODUCED BY SUCH METHOD
Filed May 24, 1918    3 Sheets-Sheet 3
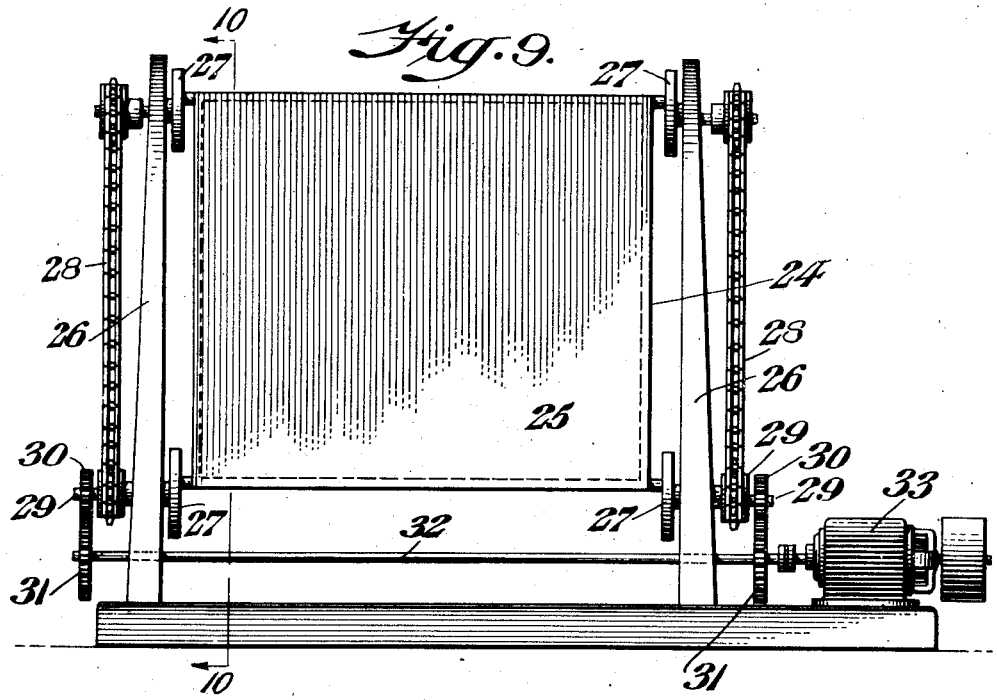
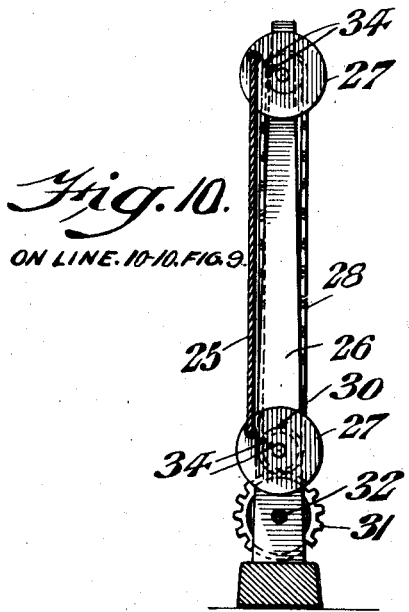

Patented Mar. 25, 1924.

1,488,027

UNITED STATES PATENT OFFICE.

WALTER OSBORNE RUNCIE, OF NEW YORK, N. Y.

METHOD OF PRODUCING AND EXHIBITING PICTURES POSSESSING STEREOSCOPIC RELIEF AND PICTURES PRODUCED BY SUCH METHOD.

Application filed May 24, 1918. Serial No. 236,423.

*To all whom it may concern:*

Be it known that I, WALTER OSBORNE RUNCIE, a subject of the King of Great Britain, residing in the city, county, and State of New York, have invented a new and useful Method of Producing and Exhibiting Pictures Possessing Stereoscopic Relief and Pictures Produced by Such Method.

My invention relates to the production of pictures in the form of composite prints on paper or other opaque support, composite transparencies on glass, or other transparent support, and analytic transparent pictures for projection by optical synthesis.

The object of my invention is the utilization of a principle whereby the observer looking at the resultant composite picture sees the objects in natural relief and apparent solidity (as seen in a stereoscope), but without the aid of intermediate optical means.

Heretofore, means have been devised to produce pictures possessing stereoscopic relief in the form of paper prints, transparencies on glass, and also by projection. In one form, the picture corresponding to the right eye was colored red, that corresponding to the left, green, or vice versa, the resultant images being superposed and viewed with discriminating colored spectacles. Another form utilized polarized light for projection, and inspection of the composite screen image with analyzers. Another form was known as the eclipse system. In this system, a right and left pair of images are projected by separate stereopticons, on a screen, in rapid alternate order through a revolving shutter, and the resultant composite picture is viewed through a device provided with an alternating shutter running in synchronism with the shutter of the stereopticon. As the right eye only sees the right image, and the left eye only the left, stereoscopic effect is produced by the assistance of persistence of vision.

Still another form utilized is a line screen in combination with a composite image on glass. All these methods, with the exception of the last named, necessitate the use of discriminating glasses or shutters before the eyes of the observer, hence they are of hardly any practical commercial value. The line screen method is restricted solely to the production of transparencies, and can only be viewed from a single definite position.

All the above methods are based on the principle of recording two plane images of the subject from slightly dissimilar view points, corresponding to the separation of the eyes, and recombining the resultant pictures in a stereoscope to produce relief.

The fundamental principle involved in my novel invention is as follows:—

A properly corrected photographic objective lens produces at its focus an aerial image or model of the subject to which it is directed. This aerial image is an exact replica of the original subject; the various points in the image being exactly proportional to corresponding points in the subject, and their distances from each other are also proportional. From the foregoing, it is clear that the aerial image possesses three dimensions corresponding to the original subject, on a scale determined by the equivalent focus of the lens and the distance from camera to subject.

The general method of utilizing the above fundamental principle, and which constitutes the basic idea in the present invention, is as follows:—

(1) The aerial image produced by the lens at its focus is systematically analyzed or progressively divided into a plurality of vertical parallel planes at right angles to its axis.

(2) In accordance with the law of optical reversibility, these analytic planes of the image are systematically superimposed in spaced relationship, or recombined by optical synthesis on a projection screen capable of receiving the analytic images progressively in their corresponding planes.

By fulfilling the above conditions the resultant picture will appear to possess stereoscopic relief, because the eyes are called upon to exert their natural power of axial and focal accommodation, thereby fulfilling the conditions required for binocular vision.

The ground glass of a camera shows only that section of the aerial image which accords with the position in which it is placed at the focus of the lens. By the progressive variation of the distance of the ground glass along the axis of the lens, the picture on the ground glass varies in size, and its different portions, corresponding to various distances in the subject, vary in definition. The values of the variations in definition increase or decrease with the focal length and relative aperture of the lens; the distribution of the sharpness of the picture for a certain position of the ground glass in the focus of the lens, obeys the law of conjugate foci; and the diameter of the circle of confusion given by a point in the subject is determined by the same law.

My invention comprehends in its broad aspect photographically recording a plurality of plane images of the subject by simultaneously or successively dissecting the aerial image into vertical parallel planes at right angles to the axis of the lens.

My invention consists, furthermore, in simultaneously or successively superimposing positive records of analytic negatives obtained in the above manner.

Figure 1 represents diagrammatically a means employed in taking a picture when the lens is shiftable.

Figure 2 represents diagrammatically a means employed in taking a picture when a supplementary lens is used.

Figure 3 represents diagrammatically a means employed in taking a picture when a light splitting means is used and one of the lenses is shiftable.

Figure 4 represents diagrammatically a means employed in taking a picture when a light splitting means is used, with one of the lenses provided with a supplemental lens.

Figure 9 represents, in front elevation, one type of a screen which may be employed.

Figure 10 represents a section on line 10—10 of Figure 9.

Figure 11 represents, in side elevation and in detached position, a driving disc seen in Figures 9 and 10.

In carying out my novel method for the production of transparencies on glass or other transparent support, or prints on paper or other opaque support, the following steps are necessary.

If an ordinary camera is used, I place it on a tripod or other firm support, focus on the foreground plane of the subject and make an exposure with a large lens aperture, this gives me a record of the subject wherein the foreground is sharp and the background out of focus. I then change the focus of the lens without moving the position of the camera, so that the objects in the background will be rendered sharp, and the objects in the foreground out of focus and then make a second exposure.

On development, I obtain two negatives, the imagese of which are unequal in size, due to the distance the lens was shifted between the exposures. The foreground plane image is larger than the background plane image,—hence I find it most convenient to enlarge the background image to correspond in size to the foreground image. The two images are then brought into register with sufficient separation between them to produce the desired stereoscopic relief. Theoretically, the separation should be equal to the distance the lens was shifted between the exposures, but, practically, much less separation will suffice to give the desired effect.

In Figure 1 of the drawings, I have illustrated a lens 1, the lens being shown in full lines in the position it assumes with respect to the plate 2 when is is desired to have the objects in the background plane of the subject appear in focus. When the lens 1 is moved into the position seen in dotted lines in Figure 1, the objects in the foreground plane of the subject will be in focus.

Figure 5:
Figure 5 represents an element in a composite picture wherein the background is in focus and the foreground is out of focus.
Figure 6:
Figure 6 represents an element in a composite picture wherein the foreground is in focus and the background is out of focus.
Figure 7:
Figure 7 represents a composite picture with the elements thereof in spaced relationship.

Referring now to Figure 5, 3 designates the background plane image, wherein the objects in the background are in focus and the objects in the foreground are out of focus. 4 designates the foreground plane image, see Figure 6, the objects in the foreground being in focus and the objects in the background being out of focus. 5 designates a composite picture, see Figure 7, which shows the images 3 and 4 as they appear when assembled with a separation 6 between them.

If the finished picture is to be a transparency the separation is preferably made by placing a frame between the image-bearing glass plates,—and if a print to be viewed by reflected light is to be formed, the background image is preferably enlarged on bromide or gas light paper, and a sheet of transparent flexible material like gelatine or celluloid inserted between the foreground image, which should preferably be printed on film, and the background image, to effect the separation, correctly superimposed and bound or cemented together to complete the picture.

If it is desired to produce only paper prints and transparencies, and the operator considers enlarging the background image to correspond in size to the foreground image, too tedious a task, it is possible to record both images the same size in the camera by enploying a suitable set of supplementary lenses of various focal lengths adapted to fit over the front of the camera objective. This will be understood by reference to Figure 2, wherein 7 designates the supplementary lens.

The procedure in such case is as follows:—

Focus on the background plane, and, if this happens to be at infinity, select a supplementary lens of a focal length equal to the distance between the camera and the principal foreground object it is desired to render sharp. Make an exposure for the background plane, then change the plate or film, place the supplementary lens over the camera objective without changing the distance between lens and plate or film. See Fig. 2. The supplementary lens will automatically change the focus to the foreground plane. Make the exposure. On development of both plates or films, both images will be identical in size. Print positives on glass or paper and superimpose in spaced relationship.

The order in which the steps of taking the exposures occurs is immaterial, as is apparent, and the two exposures may be simultaneously made by employing a reflecting camera of the light-splitting type, or a regular stereoscopic camera equipped with a combination of reflecting and light-splitting mirrors or prisms. These types admit of instantaneous exposures and hand camera work.

In carrying out my novel method for the production, and reproduction of pictures by optical projection, the same general principles of analysis and synthesis are followed, with such modifications as are found necessary.

For simplicity, we will consider the analysis of the subject into two planes only, a foreground and a background. These two plane images are recorded in the same manner as already explained, by suitably shifting the lens along its axis; this action, as we have seen, causing the images to vary in size. This is as it should be for optical projection, because the special screen necessary for correct synthesis, automatically enlarges the background image to correspond in size to the foreground image in accordance with the law of optical reversibility.

To reproduce stereoscopic relief by optical projection according to my method, the analytic foreground and background images are projected in alternate order in rapid succession on an oscillating screen, mechanically or electrically driven at a speed sufficient to satisfy the law of persistence of vision. In order that the two analytic pictures will appear stereoscopic when combined, the screen must run in synchronism with the shutter mechanism of the projector, or optical lanterns. When the foreground image is being projected, the screen must be in the foreground plane, and when the background image is being projected, the screen must be in the background plane.

The above method is equally applicable to the presentation of cinematograph as well as stereopticon pictures by projection.

The following modification can be applied only to cinematographic presentations:—

By employing a screen specially mounted and driven in a manner to impart to it an oscillating or reciprocating motion to position it in a plane at an angle to the axis of the lens, it is possible to receive on its surface successively a great number of analytic projections in synchronism with the projecting machine. The time of a complete cycle of movement of such a screen must be sufficiently short to satisfy the law of persistence of vision.

By suitable modification, an ordinary motion picture camera can be employed to record the plurality of analytic planes of the image. Provision should be made to move the lens uniformly along a path parallel to its axis with a reciprocating to and fro motion. This movement can be effected, for example, by suitable cams or levers driven by the mechanism of the camera. The amount of travel of the lens is under control of the operator, and the adjustment will depend on the distance between the extreme foreground and background planes of the subject to be rendered sharp. To reproduce the visual effect of the original subject on the screen, it is necessary to coordinate the movement of the screen in synchronism with the corresponding progression of each analytic record of the aerial image. It is also necessary that the complete series of analytic images forming a cycle on the film must correspond to a complete cycle of movement of the screen, i. e. the nearest foreground image plane must always be projected when the screen is nearest the observer, and the most distant background image plane must be projected when the screen is at the greatest distance from the observer. If the complete cycle of operation is performed in an interval of time sufficiently short to satisfy the law of persistence of vision, the resultant picture will not only depict animation, but the image will stand out in perfectly natural relief.

Synchronism of projector and screen can be effected by any suitable means, for example by means somewhat similar to those employed in the reproduction of talking pictures.

The above general method can be modified by several variations, for instance, instead of recording the analytic planes of the image with a single lens, two or more similar lenses may be disposed side by side, or otherwise, and the camera provided with a suitable shutter, a small effect of parallax being negligible. It is also possible to employ a camera provided with one lens and two or more exposure openings, similar to those employed in color photography.

A special feature of my novel invention is the distinct advantage to be gained by using lenses of comparatively large aperture, permitting great speed in recording the images without impairing the definition of the composite image on the screen.

In some cases if desired the lens of the projector may be shifted along its axis to compensate for the shift of the screen.

It will be understood that while each analytic image will appear out of focus in certain portions when viewed singly, this out-of-focus effect will entirely disappear when the composite or synthetic result is viewed.

One skilled in the art will understand from the foregoing certain of the broad and generic features of my invention, and I now desire to set forth more clearly in detail the various steps involved in the carrying out of my novel method.

*Prints on paper or other opaque support, successive exposures.*

In case an ordinary camera is employed, which is fitted with a ground-glass for focusing and successive exposures are to be taken, I proceed as follows:—

I first set up the camera on a tripod or other firm support and focus on the background plane of the subject using a large diaphragm opening in the lens to render the foreground plane of the subject out of focus. The plate or film holder is then inserted and a correct exposure made. The plate or film holder is now removed and without changing the position of the camera, I focus on the foreground plane of the subject, the diaphragm being set to the same opening as in the first instance. The plate or film holder is again inserted and another exposure is made on a separate plate or film. The two plates or films are then developed and this produces one negative in which the foreground is sharp and in focus, while the background is out of focus. The other negative has the background sharp and in focus, while the foreground is out of focus. The background plane image will be smaller than the foreground plane image due to the decrease in distance between the lens or plate or film and the consequent increase of angle of view. The background plane image must be brought to the same size as the foreground plane image, or vice versa. This can be accomplished by enlargement or reduction, i. e. the background image can be enlarged to the same size as the foreground image, or the foreground image can be reduced to the same size as the background image. It is preferable, however, to enlarge the background image. In order to make a composite print on paper or other opaque support to be viewed by reflected light, I make an enlargement on bromide or enlarging gas light paper from the background plane negative image to correspond to the foreground negative plane. I then make a contact print on composite celluloid film or carbon tissue from the foreground negative image. A sheet of transparent flexible material such as gelatine or celluloid of suitable thickness is inserted between the background image-bearing paper support and the transparent foreground image-bearing support, to effect the necessary separation to produce stereoscopic relief. Both images are then adjusted in proper register and then united together in optical contact. This completes the print in relief.

Several variations of the foregoing are within the scope of my invention; for example, it does not matter in what order the analytic negatives are taken.

Again, the background plane negative image may be printed directly on the paper support by contact and the foreground plane image may be reduced in size to correspond to the background image.

An enlarged composite print may also be made by enlarging both analytic negatives to any reasonable size. The only condition required is to enlarge both images to the same size for correct superposition.

Any kind of sensitive photographic paper may serve to support the background plane image, and any form of sensitized transparent flexible support may serve to support the foreground plane image.

*Method when camera is not provided with a ground glass for focusing.*

If a kodak or similar form of camera is used which is not provided with a ground glass for focusing the camera is set on a tripod or other rigid support. I then extend the bellows and set the pointer over the scale to the distance corresponding to the plane in the subject it is desired to render sharp to form the background plane image. I then make an exposure. The film is next changed and without moving the camera I set the pointer on the scale to correspond to the distance of the foreground objects and make another exposure. The preparation of prints from these analytic negatives is identical with the method already described.

*Ordinary equipment with a battery of supplementary lenses.*

An ordinary camera fitted with a ground glass for focusing is set up on a tripod or other rigid support. I then focus on the background plane of the subject using a large diaphragm opening in the lens, insert the plate or film holder, and make a correct exposure. The plate or film is then changed and without changing the position of the camera or disturbing the focus of the lens, I select a supplementary lens of proper focal length and place it over the front of the camera lens. This will render the foreground sharp, and the background out of focus. I now make another exposure. Both images on development will be of the same size because the lens was not shifted in making the different exposures. The contact prints are then made. The background plane image may be printed directly on the sensitive paper support, and the foreground plane image may be printed on a sensitive transparent flexible support. Both analytic prints are assembled in their correct relation with a transparent flexible separating medium between them and the parts preferably cemented together in optical contact. Both analytic negatives may be enlarged to any desired size, and any enlarging method may be employed. The only necessary condition to be fulfilled is that the prints or enlarged records must be of the same size for correct superposition.

*Method using a battery of supplementary lenses with a camera not provided with a ground glass for focusing.*

If the camera is not provided with a ground glass for focusing, it is set up on a tripod or other rigid suport, the pointer on the scale is set to the distance corresponding to the background plane and an exposure is made. The film is then changed and without moving the position of the camera, or disturbing the focus of the lens, a supplementary lens of proper focal length is slipped over the camera lens in order to render the foreground plane sharp. Another exposure is now made. The resultant analytic negatives will be of the same size because the distance between the lens and film was not changed in making the different exposures. Contact prints or enlargements as desired are made and these are superimposed in accordance with the previous method.

*Method using simultaneous exposures using ordinary stereoscopic equipment fitted with light splitting and reflecting prisms or metallic mirrors.*

In order that this feature of my invention may be clearly understood I will describe as concisely as possible a stereoscopic camera which can be employed, it being of course understood that many other forms of cameras may be adapted for the production of pictures in relief in accordance with my novel method.

The stereoscopic camera is fitted with a combined light-splitting and reflecting arrangement and prisms or metallic mirrors may be utilized for this purpose. A solid or continuous reflecting surface is also employed which is constructed in such a manner that it transmits one half of the light received on its surface and reflects the other half. The front of the camera supporting the lenses is arranged to slide along the track to provide for the focusing. One of the lenses may be set in a separate focusing mount or supplementary lenses may be employed to make the necessary corrections of focus for the background and foreground planes of the image. In Figures 3 and 4, I have shown a stereoscopic camera of the types above described.

In Figure 3, 20 designates a light reflecting mirror which transmits one-half of the light it receives to the lens 21 which is fixed to the camera and reflects the other half of such light to a mirror 22 having a continuous reflecting surface which transmits the light received to a lens 23 set in a separate focusing mount 37 which is provided with a set screw 38 for securing the lens 23 in its adjusted position. In Fgure 4, instead of one of the lenses being set in a separate focusing mount, I employ a supplemental lens. In this embodiment, I have shown a stereoscopic camera wherein 39 designates a light reflecting mirror which transmits one-half of the light received to the lens 40 and reflects the other half to a mirror 41 having a continuous reflecting surface which transmits the light received to a supplementary lens 42. The light from the lens 42 passes through the lens 43.

The camera is placed on a tripod for convenience of focusing if it is provided with a ground glass, or it is held in the hand if of a scale focusing type. The background plane image is focused or the scale is set for that distance. If one lens is provided with a separate focusing mount the lens is racked out or advanced to render the foreground plane sharp. If, instead, supplementary lenses are being used one of suitable focus which will render the foreground sharp is slipped over the front of one of the camera lenses.

If we trace the path of the light from the subject to the film or plate, it will be observed that both pictures will be recorded from a single view point. Light rays from the subject enter the openings of the light-splitting reflector, pass through the lens and record in this case the foreground plane image on the plate or film. Light rays traversing the same general paths as the others impinge on the reflecting surface of the light-splitting reflector and are then deflected to the solid or continuous reflecting surface and again deflected through the lens to the background plane recording plate or film.

On development, the positive prints from this pair of analytic negatives are made as already described by the two methods employed, depending on whether the analytic negatives were made of the same size or of unequal sizes.

By using a stereoscopic camera fitted with the devices above enumerated, both analytic images are recorded simultaneously and consequently such a camera is eminently suited for making instantaneous exposures.

Colored prints or natural color pictures are also in the scope of the hereinbefore described method.

*Transparencies on glass or other transparent support.*

All of the methods hereinbefore set forth for the production of pictures on paper or other opaque support, are equally applicable to the production of transparencies to be viewed by transmitted light. Modifications are made necessary on account of the physical differences involved. The negatives are made in exactly the same manner in both cases. The difference exists only in the method of printing and assembling the positives. Instead of printing or enlarging the background plane image on paper or other opaque support, the impression is transferred to an emulsion-coated glass plate or other rigid transparent support. The foreground plane image is preferably printed or enlarged on an emulsion-coated glass plate or other rigid transparent support.

The analytic positive images thus obtained are of identical size and are then assembled with a separating frame of cardboard or other suitable material of sufficient thickness between the two image-bearing glasses to effect the necessary separation. The images are then brought into correct register, and the composite transparency is bound securely around the edges with binding tape, or other means, to complete the picture in relief. Colored transparencies and transparencies in natural colors in all forms can be produced by this method.

*Transparencies for optical projection.*

Lantern slides or transparencies for optical projection are produced in the same manner as transparencies to be viewed with transmitted light, with the following exception:—

Supplementary lenses must not be used on the camera when making the negatives intended for projection. The foreground plane and background plane images must be produced by a relative shift of the lens along its axis to produce negatives of unequal size. This is necessary to fulfill the conditions of the law of optical reversibility when the analytic positive transparencies are projected on a synthetic screen. The foreground plane image must be projected when the screen is nearest the observer, and the background plane image must be projected when the screen is farthest from the observer. An automatic direction of the size of the image on the screen takes place because of the increase of distance between the projecting lens and the screen while the latter is in the background plane and will cause an increase in the size of the background plane image to correspond in size to the foreground plane image when the screen is nearest the observer.

Two optical projecting lanterns or one lantern with two exposure openings is preferably used to project the analytic positive images on the screen.

One lantern projects the foreground plane image, and the other lantern the background plane image. These two analytic images should be made to coincide as closely as possible when both images are projected simultaneously on one particular plane of the screen. This can be effected by directing the axes of the lenses of both lanterns to coincide at the center of the screen.

A special screen is preferably required by my method and a typical construction of such screen will now be described.

The type which I desire to disclose is one in which the framework of the screen is of wood or metal of sufficient width and height to accommodate the desired size of screen. On standards at either side of the framework four discs or levers are arranged to rotate in a horizontal plane at right angles to the projecting lens. These four discs are interconnected by chains or sprockets, and are preferably driven by an electric motor by means of suitable gearing.

A screen of proper material, for example textile material, is stretched on the framework, which latter is mounted near the periphery of the disc or at a suitable point along the arms of the levers. These discs or levers run in perfect unison and carry the screen in a rotary manner, and impart to it an oscillating or reciprocating motion relative to the axis of the projecting lens. In other words the screen during operation will assume successively a large number of planes at right angles to the axis of the projecting lens and limited by the diameter of the disks. In Figures 9 to 11 inclusive, I have shown a type of screen as described, wherein 24 designates the framework which carries the screen 25. 26 are standards in which are mounted disks 27 which are rotated by sprocket chains 28 passing over sprocket wheels 29 fastened to the disks. The lower sprocket wheels 29 are connected to gears 30 which are driven by gears 31 on a shaft 32 which latter is rotated by a motor 33. The disks 27 have spaced apertures 34 to receive the framework so that the extent of movement of the screen may be varied, as is evident. The optical lanterns must be provided with suitable shutters which are connected either electrically or mechanically with the moving screen so that while the foreground plane image is being projected the screen will be in the foreground plane or nearest the observer, and while the background plane image is being projected, the screen will be in the background plane.

In other words the analytic images are projected alternately and at sufficient speed to satisfy the law of persistence of vision.

*Adaption of the method to the production and exhibition of moving pictures.*

Figure 8:
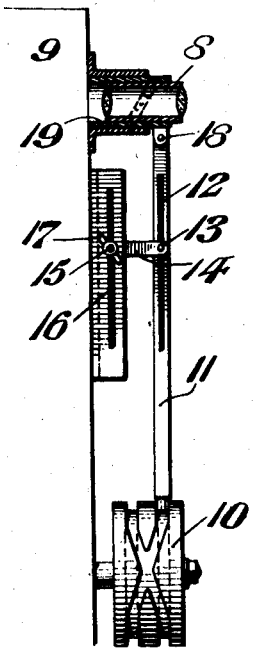
Figure 8 represents, in sectional elevation, means to shift a lens into proper focus for the background or foreground plane.

I will first describe a method in which an ordinary motion picture camera can be used, modified by an attachment for intermittently moving the lens along its axis. If for example a camera of the Pathé type is used, the lens is movable and the balance wheel and its shaft carries an intermittent film feeding gear which is located near the lens and almost in the same plane. By mounting the lens in a suitable sliding tube or sliding base and cutting grooves in the periphery of the balance wheel in the form of cams, commonly known as drunken screws, it is possible to get any desired amount of intermittent travel of the lens by arranging a suitable lever mounted on a sliding fulcrum to act as the connecting link between the sliding tube of the lens and the balance wheel which furnishes the drive. This will effect an intermittent movement of the lens for every revolution of the balance wheel. In Figure 8 of the drawings, I have shown one type of means which can be employed to effect the proper travel of the lens 8 of the connecting camera 9. 10 designates a cam driven by a moving part of the projecting camera in synchrony with the movement of the film. This cam 10 has a cam groove in which is positioned one end of a lever 11 which is provided with a slot 12 into which extends a pivot pin 13 carried by an arm 14. The arm 14 is secured to a threaded rod which passes through the slot 16 in the camera casing and is fixed in its adjusted position by means of a nut 17. The upper end of the lever 11 is pivotally connected at 18 to a tube 19 in which the lens 8 is mounted. As the cam 10 revolves, the lens 8 will be moved forwardly and rearwardly, as is evident. Its action in taking a picture is as follows:—The camera is set up on a tripod and the lens adjusted for the background plane focus by revolving the balance wheel until the lever throws the lens in the background plane through the action of one of the cams. The background plane of the subject is focused by aid of the focusing mount with which the lens is preferably provided and with which it it preferably firmly locked. The balance wheel is rotated a complete revolution to move the lens into the foreground plane. Proper focus is then secured on the foreground plane of the subject by sliding the movable fulcrum of the lever when the foreground plane image is sharp, and the fulcrum is then clamped or locked. The camera is now adjusted, ready for operation. When the crank of the camera is turned the action which takes place is as follows:—

The film is moved down one picture space and the shutter opened. This allows, for example, the foreground plane image to be recorded, the lens remaining stationary for that period. The shutter closes while the film is being pulled down another picture space. At the same time the lens moves over to the background plane focus. The shutter again opens and the background plane image is recorded. This cycle of operation is repeated in rapid succession, recording alternately background and foreground plane images of the subject in a space of time sufficiently short to satisfy the law of persistence of vision.

A positive print made from the negative secured in the above manner can be projected in any ordinary motion picture projector on a screen of similar design to those I have described for optical lantern projection in accordance with my method. It is only necessary to provide a suitable synchronizing apparatus to cause the projector and screen to operate in unison. This can be accomplished by direct mechanism connection, or more conveniently by employing two synchronous alternating current motors which are interconnected, one being adapted to drive the projector and the other to drive the screen. Synchronizing devices as used in the exhibition of talking pictures can be also employed.

The essential feature to be borne in mind is that the foreground plane image must be projected while the screen surface is in the foreground plane, and the background plane image projected while the screen is in the background plane.

Tinted, toned or hand-stencilled colored or natural color motion pictures all come within the scope of this portion of my invention.

Instead of recording the images alternately on the film, a special form of camera with two exposure openings adjacent each other and provided with two lenses of similar focus can be utilized. Each lens is mounted in a separate focusing mount so that one can be adjusted for the background plane of the subject and the other for the foreground plane. Two picture spaces of film are pulled down at each movement of the intermittent gear. The small amount of parallax introduced by the slight separation of view points of both lenses is negligible. If desired, a light-splitting prism or mirror similar to those adapted and employed for a regular stereoscopic camera for still pictures, may be utilized.

*Utilizing an ultra fast motion picture camera of intermittent type modified by an attachment for moving a lens uniformly along its axis.*

If desired, more than two planes of the subject can be recorded by utilizing a camera capable of being driven at a fairly high speed. In this case the lens must be arranged to travel uniformly along its axis at sufficient speed to complete a cycle of operation in a space of time sufficiently short to satisfy the law of persistence of vision when the result is projected on the screen.

For example, suppose it is desired to record eight separate planes of the subject, the lens must travel uniformly from the extreme foreground plane, that is the nearest point to the camera it is desired to render sharp, to the extreme background plane, that is the farthest point from the camera it is desired to render sharp, and back again in a space of time sufficiently short to satisfy the law of persistence of vision. In this space of time, sixteen pictures must be recorded to cover the eight planes twice, because the lens is travelling to and fro, and each plane is recorded twice for each cycle of movement of the lens.

For projection, an ultra rapid projector must be used to project this great number of analytic planes in the same space of time taken to record the images in the camera.

A screen working under the principle already described is necessary for correct synthesis of pictures taken in this way.

A complete cycle of analytic images obtained in the above manner must be projected on the synthetic screen in the time it takes the screen to travel from the foreground plane to the background plane and back again to the foreground plane. Both screen and projector must be driven in synchronism. A modification of the above screen with distinct advantages and especially suitable for projection of a great number of analytic image planes is described below.

A frame similar to that used in the disk or lever form of screen is utilized and another similar pair of standards is arranged at a suitable distance behind the former. In place of the disks or levers, sprockets are substituted; sprockets are also mounted on studs on the rear standards directly opposite and in alignment with those in front. The corresponding front and rear sprockets are connected by chains, and the screen, mounted on a frame, is pivotally mounted on the chains, so that when the mechanism is started the screen will travel to and fro in a direction along the axis of the projection lens. This screen provides for great depth of oscillation or movement along the axis of the lens with very little vertical movement. Synchronism between projector and screen is necessary, as usual.

In the methods heretofore employed in stereoscopic projection it has been absolutely necessary to employ intermediate optical means or shutters in front of the eyes of each individual observer, while in accordance with my present method the picture on the screen is viewed directly and it is unnecessary to employ any intermediate means or shutter.

In the methods heretofore employed in the taking of pictures it has been deemed necessary to take the pictures from two different viewpoints corresponding approximately to the distance between the human eyes, while in my method the various planes in the subject are recorded from a single view point.

In all of the methods heretofore proposed two plane pictures are recorded from different view points, and these two viewpoint pictures are united in the brain by the aid of a stereoscope which compels each eye to see only its own image, and thus produce stereoscopic perception.

In accordance with my present method a plurality of related images of the subject are systematically recorded in planes parallel with and substantially spaced from each other, and each image is recorded in its proper focus. These analytic plane images thus recorded are synthesized in proper relation to reproduce all the relative distances in the original subject. The effect is exactly the same as if the subject was viewed directly, because the eyes are called upon to exert their full power of axial and focal accommodation, as actually occurs in nature. In accordance with my present invention the product resulting from my method is a support having on it images which are indicative of parallel analytic planes of the subject, and the image in each plane is in its proper focus.

Having thus described my invention what I claim as new and desire to secure by Letters Patent, is:—

1. The method of producing pictures possessing stereoscopic relief, which consists in recording from the same angular viewpoint a plurality of related images of the subject in planes parallel with and substantially spaced from each other, with each image in its proper focus.

2. The method of producing pictures possessing stereoscopic relief which consists in successively recording from the same angular viewpoint a plurality of related images of a subject in planes parallel with and substantially spaced from each other, with each image in its proper focus.

3. The method of producing pictures possessing stereoscopic relief, which consists in simultaneously and successively recording from the same angular viewpoint a plurality of related images of a subject in planes parallel with and substantially spaced from each other, with each image in its proper focus.

4. The method of stereoscopic photography which consists in recording from the same angular viewpoint a plurality of related images of the subject in planes parallel with and substantially spaced from each other, with each image in its proper focus, and projecting the images on a screen.

5. The method of stereoscopic photography, which consists in recording from the same angular viewpoint the objects in different planes of the subject in focus. projecting the images on a screen, and positioning the screen in planes corresponding to the planes of the images being projected.

6. The method of stereoscopic photography, which consists in recording the objects in different planes of the subject in focus, projecting the resultant images on a screen, positioning the lens of the projector in accordance with the analytic planes of the image, and positioning the screen in different planes in synchronism with the corresponding progression of each analytic record of the image.

7. The method of stereoscopic photography, which consists in recording the objects in different planes of the subject in focus, projecting the resultant images on a screen, positioning the lens of the projector in accordance with the analytic planes of the image, positioning the screen in different planes in synchronism with the corresponding progression of each analytic record of the image, and completing the cycle of operation in an interval of time sufficiently short to satisfy the law of persistence of vision.

8. A film for optical projection having images thereon in focus indicative of the same angular viewpoint and indicative of analytic parallel planes of the subject, substantially spaced from each other.

9. A film for optical projection having images thereon in focus indicative of the same angular viewpoint and indicative of analytic parallel planes of the subject substantially spaced from each other, the images indicative of different planes being alternately arranged.

10. A film for optical projection having on it images indicative of parallel analytic planes of a subject with the image in each plane in proper focus and with the images of different planes of different sizes.

11. In combination with a moving picture film having on it a plurality of analytic plane images of the subject in spaced relationship to produce stereoscopic relief with the images of different planes of different sizes, of means to project said images on a screen, and means to cause the screen to be positioned in planes corresponding to the planes of the picture being projected.

12. The method of stereoscopic photography, which consists in recording the objects in different planes of the subject in focus, projecting the resultant images on a screen, and positioning the screen in different planes in synchronism with the corresponding progression of each analytic record of the image.

13. The method of stereoscopic photography, which consists in recording the objects in different planes of the subject in focus, projecting the resultant images on a screen, positioning the screen in different planes in synchronism with the corresponding progression of each analytic record of the image, and completing the cycle of operation in an interval of time sufficiently short to satisfy the law of persistence of vision.

14. The combination with a moving picture screen, of means to position it in different planes during the projection of a picture on it.

15. A support having images thereon indicative of parallel analytic planes of and indicative of the same angular viewpoint of the subject substantially spaced from each other, with the image in each plane in its proper focus.

In testimony whereof I have hereunto signed my name this twentieth day of May, 1918.

WALTER OSBORNE RUNCIE.

In the presence of:—
H. S. FAIRBANKS,
J. BONSALL TAYLOR.